Oct. 16, 1956   G. A. LYON   2,767,029
WHEEL COVER
Filed Feb. 18, 1954
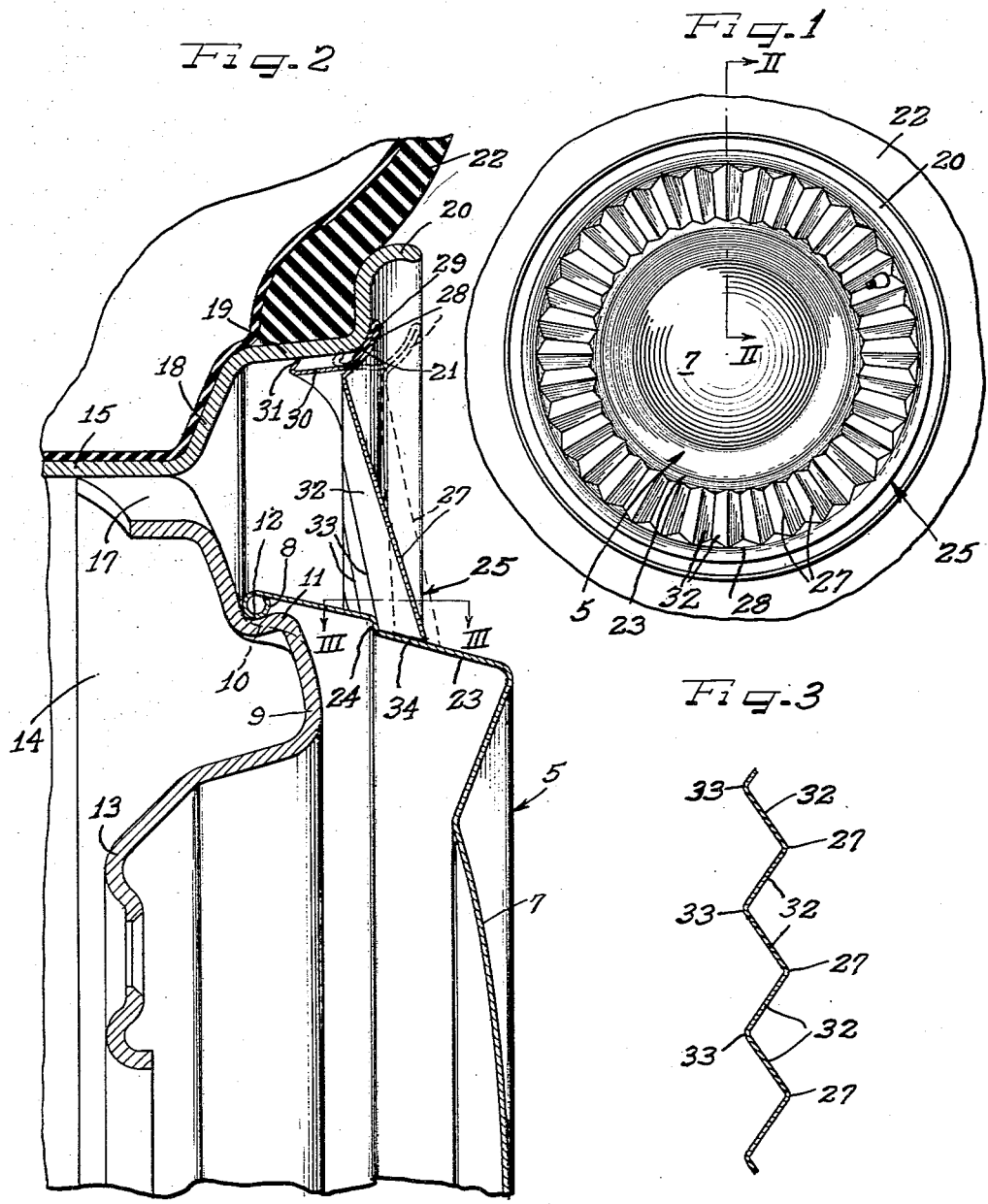
Inventor
GEORGE ALBERT LYON United States Patent Office 2,767,029
Patented Oct. 16, 1956

2,767,029

WHEEL COVER

George Albert Lyon, Detroit, Mich.

Application February 18, 1954, Serial No. 411,147

12 Claims. (Cl. 301—37)

The present invention relates to improvements in wheel structures and more particularly concerns the ornamental and protective covering of the outer sides of vehicle wheels.

An important object of the present invention is to provide a novel hub cap and trim ring combination in a wheel structure.

Another object of the invention is to provide an improved wheel structure having an optional trim ring component of novel structure.

A further object of the invention is to provide an improved wheel structure having a novel cooperative hub cap and trim ring assembly.

Still another object of the invention is to provide a novel trim ring construction.

Still another object of the invention is to provide a novel hub cap structure adapted to cooperate with a trim ring to maintain the trim ring under tensioned engagement therewith.

Other objects, features and advantages of the present invention will be readily apparent from the following detailed description of a preferred embodiment thereof taken in conjunction with the accompanying drawing in which:

Figure 1 is a side elevational view of a wheel structure embodying features of the invention;

Figure 2 is an enlarged fragmentary radial sectional view taken substantially on the line II—II of Figure 1; and Figure 3 is a fragmentary sectional detail view through the trim ring taken substantially along the line III—III of Figure 2.

In the present instance the invention is applied to a wheel structure embodying features of my invention as covered in Patent 2,445,330 issued July 20, 1948. Accordingly, a hub cap 5 having a crown portion 7 and a resilient beaded inwardly curled edge portion 8 is adapted to be applied in snap-on pry-off relation to the outer side of a wheel comprising a disk spider body having an intermediate annular axially outwardly extending nose bulge 9 provided at the radially outer side thereof with a generally radially outwardly facing annular shoulder 10 having at suitable intervals such as 3 to 5 radially outwardly extending cover retaining bumps 11 over which the hub cap bead 8 is adapted to be snapped into retaining engagement with generally radially outwardly and axially inwardly facing retaining shoulders 12 on the bumps spaced radially outwardly relative to the wheel body shoulder 10. Radially inwardly from the nose bulge 9 the wheel body has a dished bolt-on flange 13, while at the radially outer margin the wheel body is provided with a generally axially inwardly extending attachment flange 14 which is secured in any suitable manner to a base flange 15 of a multi-flange, drop center tire rim. At appropriate intervals the attachment flange 14 is preferably inset to provide wheel openings 17.

From the base flange 15 of the tire rim extends an outer side flange 18 directed generally radially outwardly and sloping axially outwardly and merging with an intermediate generally axially outwardly extending and radially outwardly sloping flange 19 which joins a terminal flange 20 extending generally radially outwardly therefrom and then turning axially outwardly. At juncture of the intermediate and terminal flanges is a rounded shoulder 21. A pneumatic tire and tube assembly 22 is adapted to be supported by the tire rim.

According to the present invention the hub cap 5 is provided between the crown 7 and the attachment bead 8 with a generally frusto-conical axially inwardly and radially outwardly sloping annular side wall 23 provided intermediate its ends and preferably generally opposite the shoulder 21 of the tire rim with a step-like generally axially outwardly facing, annular shoulder 24 receptive of the radially inner margin of a trim ring 25 adapted to lie in substantial covering relation to the tire rim and to bridge across the gap between the tire rim and the hub cap side wall 23.

By preference the trim ring 25 is constructed of suitable resilient sheet metal such as stainless steel or brass or the like which may be attractively polished and plated to provide a high lustrous, easily cleaned surface and not only protectively covers the outer side of the wheel but also provides a pleasing ornamental appearance therefor. Such ornamental appearance is heightened by providing the covering 25 with a uniform series of generally radially extending spoke-like ribs 27. These ribs extend radially inwardly from a generally radially and axially inwardly directed annular outer marginal reinforcing flange 28 preferably of concave convex annular rib-like form adapted to overlie the tire rim shoulder 21. For additional stiffness the flange 28 is provided with an underturned complementary flange portion 29 thereby affording a double flange structure.

For retaining the trim ring 25 on the wheel, the underturned generally radially and axially inwardly extending flange 29 is provided with a series of resiliently flexible generally axially inwardly extending retaining fingers 30 normally extending at their inner ends to a diameter substantially the same as the inside diameter of the intermediate portion of the intermediate flange 19 so that short and stiff generally radially and axially outwardly oblique retaining terminal flanges 31 on the fingers will enter into grip retaining press-on, pry-off relation with the inside face of the intermediate flange 19. Hence, when the trim ring 25 is pressed inwardly from the dash outline position shown in Fig. 2 to the full line position, the retaining fingers 30 are placed under resilient tension by being radially inwardly deflected as the retaining terminals 31 cam inwardly along the oblique face of the intermediate flange.

Tensioned rattle-free engagement of the inner margin of the trim ring 25 with the hub cap shoulder 24 is assured by having the shoulder engaging inner face portion of the trim ring inner margin disposed normally in such radially inward disposition relative to the outer marginal flange 28 that as the trim ring is pressed axially inward into assembled position on the wheel the inner margin will engage the shoulder 24 of the hub cap in advance of seating of the trim ring outer marginal flange 29 against the tire rim shoulder 21. To this end, the radial ribs 27 are preferably of a construction which will enable circumferential resilient expansion of the inner margin of the trim ring, as well as axial deflection of the ribbed body portion of the trim ring as the trim ring is pressed home into the assembly. In a desirable construction, the ribs 27 are of generally accordion pleat structure comprising respective side walls 32 which merge on radial accordion pleat action junction roots 33 in the present instance complementary to the accordion action flexible radial ridges provided by the ribs 27. In the normal, unflexed condition of the ribbed body portion of the trim ring, the root rib-like junctures 33 may extend approximately straight radially inwardly as indicated in dash outline in Fig. 2. As the trim ring is pressed axially inwardly, the inner ends of the juncture bends 33 bear against the hub cap shoulder 24 in advance of seating of the flange 29 of the trim ring against the tire rim so that as the radially outer marginal structure of the trim ring is pressed on toward seating against the tire rim the inner ends of the ribs that have now come to a stop against the shoulder 24 remain stationary in an axial sense but expand slightly in a circumferential sense as the radially outer portions of the ribs flex axially inwardly at their junctures with the outer marginal flange 28. As a result the radially inner ends of the ribs at the juncture bends 33 press firmly under resilient tension against the shoulder 24.

In order to afford the appearance in assembly of the trim ring 25 being a radially outer part of the hub cap 5 which it surrounds, the inner terminals of the ribs 27 are preferably shaped substantially complementary as shown at 34 to the frusto-conical opposing surface of the hub cap wall 23 toward which the rib terminals are directed in assembly.

By the efficient self-retaining manner in which the trim ring 25 is applied to the wheel and the tensioned engagement of the inner margin of the trim ring with the hub cap side wall, the trim ring cooperates in holding the hub cap on the wheel. Therefore the retaining bead structure 8 and the contiguous wall portion of the hub cap may be constructed of a softer, more flexible resiliency than may be desirable where no auxiliary or supplementary retention of the hub cap as supplied by the trim ring 25 is utilized. Thereby attachment and removal of the hub cap is made easier. The same pry-off tool by which the trim ring 25 may be removed by manipulating the same behind the marginal flange structure 28, 29 may after the trim ring is removed be utilized to pry the retaining bead 8 of the hub cap from engagement with the retaining bumps 11.

It will be understood that modifications and variations may be effected without departing from the scope of the novel concepts of the present invention.

I claim as my invention:

1. In a wheel structure including a tire rim and a wheel body, a hub cap attached to the wheel body and having a side wall, a trim ring having a radially outer portion attached to the tire rim and having a radially inner ribbed body portion engaging the hub cap under resilient tension.

2. In a wheel structure including a tire rim and a wheel body, a hub cap engageable with the wheel body and having a generally axially inwardly and radially outwardly extending frusto-conical side wall, a trim ring engageable with the tire rim and having a generally radially inwardly and axially outwardly extending portion with an inner margin generally complementary to said frusto-conical side wall and engaging the side wall with said margin directed edgewise toward said side wall.

3. In a wheel structure including a multi-flange tire rim and a wheel body supporting the tire rim, a hub cap engageable with the wheel body, and a trim ring engageable with the tire rim and having an inner margin engageable with the hub cap, said trim ring comprising an outer annular substantially rigid marginal portion having retaining fingers thereon grippingly interengageable with a flange of the tire rim and an inner body portion comprising a series of generally radially extending resilient ribs resiliently flexible to maintain the inner margin of the trim ring firmly against the hub cap.

4. In a wheel structure including a wheel body and a tire rim supported thereby, a hub cap engageable with the wheel body and a trim ring engageable with the tire rim, said trim ring having a series of generally radially extending accordion pleat spoke-like ribs having generally radially extending juncture bends at the axially inner side of the trim ring engaging at their end portions against the hub cap.

5. In a wheel structure including a wheel body and a tire rim supported thereby, a hub cap engageable with the wheel body and a trim ring engageable with the tire rim, said trim ring having a series of generally radially extending accordion pleat spoke-like ribs having generally radially extending juncture bends at the axially inner side of the trim ring engaging at their end portions against the hub cap, the hub cap having an annular generally axially outwardly facing shoulder against which said juncture bend end portions engage.

6. In a wheel structure including a wheel body and a tire rim supported thereby, a hub cap engageable with the wheel body and a trim ring engageable with the tire rim, said trim ring having a series of generally radially extending accordion pleat spoke-like ribs having generally radially extending juncture bends at the axially inner side of the trim ring engaging at their end portions against the hub cap, the hub cap having an annular generally axially outwardly facing shoulder against which said juncture bend end portions engage, the hub cap having an annular generally radially outwardly facing wall axially outwardly from said shoulder and the accordion pleat ribs having end portions generally complementary to said wall and lying closely adjacent thereto.

7. In a wheel structure including a multi-flange tire rim and a wheel body supporting the tire rim, a hub cap engageable with the wheel body, and a trim ring engageable with the tire rim and having an inner margin engageable with the hub cap, said trim ring including an outer annular substantially rigid portion having means thereon retainingly interengageable with a flange of the tire rim and a series of generally radially inwardly extending resilient ribs projecting from said portion and resiliently flexible to bear firmly against the hub cap.

8. In a wheel structure including a wheel body having thereon means for retaining a hub cap and a tire rim having a generally radially inwardly facing flange, a hub cap for disposition on the wheel body and having means cooperating with said hub cap retaining means to hold the hub cap on the wheel body, and a trim ring having a radially outer portion including means thereon engageable with the flange of the tire rim and generally radially inwardly directed elongated ribs resiliently deflectable relative to said radially outer portion and engageable against the hub cap under substantial resilient tension thrusting generally axially inwardly supplementary to retentive coaction of the hub cap and said hub cap retaining means on the wheel body.

9. In a wheel structure including a wheel body having thereon means for retaining a hub cap and a tire rim having a generally radially inwardly facing flange, a hub cap for disposition on the wheel body and having means cooperating with said hub cap retaining means to hold the hub cap on the wheel body, and a trim ring having a radially outer portion including means thereon engageable with the flange of the tire rim and generally radially inwardly directed elongated ribs resiliently deflectable relative to said radially outer portion and engageable against the hub cap under substantial resilient tension thrusting generally axially inwardly supplementary to retentive coaction of the hub cap and said hub cap retaining means on the wheel body, said ribs having tips of substantial axial extent and obliquely conformed complementary to an oblique side wall of the hub cap so that in viewing the assembly from the outer side the ribs appear to join the hub cap side wall.

10. In a trim ring for disposition at the outer side of a vehicle wheel, an annular reenforcing outer marginal structure having means for attachment of the trim ring to a tire rim, and a generally radially inwardly directed body portion angular thereto having a uniform series of generally radially extending ribs flexible both axially and circumferentially relative to said outer marginal structure, said ribs being of substantially accordion pleat formation comprising longitudinal divergently related side walls which are connected together along radially extending sharp angle divergent junctures and relatively flexibly to expand away from one another and contract toward one another uniformly about the trim ring and incident to the expansion or contraction moving axially relative to said reenforcing outer marginal structure about a fulcrum adjacent juncture of said body portion with said marginal structure.

11. In a wheel structure including a tire rim and a wheel body supporting the tire rim, a cover member for disposition in fixed relation against the wheel body, and a cover member for disposition in retained relation with the tire rim and being movable axially inwardly into engagement with the tire rim, said tire-rim-engaging cover member having extending generally radially inwardly therefrom in bridging relation to said wheel-body-engaging cover member a series of resiliently flexible spoke-like portions which are axially flexibly adjustable to both of said cover members incident to axial movement of said tire-rim-engaging cover member with respect to both the tire rim and said wheel-body-engaging cover member.

12. In a wheel structure including tire rim and wheel body parts with a hub cap on the wheel body part, a trim ring for disposition at the outer side of the wheel including an annular reenforcing outer marginal structure having means for attachment of the trim ring to the tire rim, and a generally radially inwardly directed body portion angular thereto having a uniform series of generally radially extending ribs flexible both axially and circumferentially relative to said outer marginal structure and arranged to overlie the wheel body between said outer marginal structure and the hub cap, said ribs being of substantially accordion pleat formation comprising longitudinal divergently related side walls which are relatively flexibly connected to expand away from one another and to contract toward one another uniformly about the trim ring and incident to the expansion or contraction moving axially relative to said reenforcing outer marginal structure and to the wheel body and the hub cap about a fulcrum adjacent juncture of said trim ring body portion and said marginal structure to accommodate application of the trim ring to the wheel and movement of said outer marginal structure axially relative to the tire rim while the radially inner extremity of the trim ring remains substantially in fixed position relative to the hub cap.

References Cited in the file of this patent

UNITED STATES PATENTS

| | | |
|---|---|---|
| 2,217,086 | Whitacre | Oct. 8, 1940 |
| 2,368,243 | Lyon | Jan. 30, 1945 |
| 2,383,071 | Mulhern | Aug. 21, 1945 |
| 2,544,703 | Lyon | Mar. 13, 1951 |
| 2,639,948 | Grimshaw | May 26, 1953 |